(12) United States Patent
Higham

(10) Patent No.: US 6,367,424 B1
(45) Date of Patent: Apr. 9, 2002

(54) BLIND ANIMAL SAFETY HARNESS

(75) Inventor: David J. Higham, Grays (GB)

(73) Assignee: Leslie P. Reiken, Cumming, GA (US)

( * ) Notice: Subject to any disclaimer, the term of this patent is extended or adjusted under 35 U.S.C. 154(b) by 0 days.

(21) Appl. No.: 09/563,054

(22) Filed: May 1, 2000

(51) Int. Cl.[7] .............................................. A01K 15/02
(52) U.S. Cl. ...................... 119/850; 119/837; 119/766; 119/856
(58) Field of Search ................................ 119/856, 850, 119/792, 815, 793, 836, 831, 832, 837, 766

(56) References Cited

U.S. PATENT DOCUMENTS

| | | | |
|---|---|---|---|
| 684,047 A | * 10/1901 | Decker | 119/766 |
| 1,105,767 A | 8/1914 | Goff | |
| 2,320,848 A | * 6/1943 | Byars | |
| 2,513,939 A | * 7/1950 | Rose et al. | 228/179.1 |
| 4,036,179 A | 7/1977 | Turner et al. | 119/96 |
| 4,559,906 A | * 12/1985 | Smith | 119/865 |
| 4,583,493 A | 4/1986 | Terry | 119/130 |
| 4,799,458 A | * 1/1989 | Goshorn et al. | 119/815 |
| 5,012,764 A | 5/1991 | Fick et al. | 119/106 |
| D324,117 S | 2/1992 | Antoine | D30/144 |
| D391,392 S | 3/1998 | Adams | D3/5 |
| 5,787,842 A | 8/1998 | Shmoldas | 111/856 |

* cited by examiner

Primary Examiner—Yvonne R. Abbott
(74) Attorney, Agent, or Firm—Kenneth S. Watkins, Jr.

(57) ABSTRACT

A blind animal safety harness comprises an elongated harness extension attached to a body harness by an extension fastener. Adjustable harness fasteners provide secure fitting of the harness to a variety of animals of different sizes. The extension fastener supports the harness extension from the harness in a generally horizontal configuration. The length of the harness extension provides forward extension beyond the forwardmost portion of the animal's head, providing protection from injury from collision with objects and obstructions. The forward extension also provides neuromuscular feedback to warn the animal of obstructions without hard collisions. Lateral extension of the harness extension provides lateral clearance between the harness extension and the side of the animal's head, preventing direct collision of the animal's head with objects and obstructions to the side. In the preferred embodiments, the harness extension is generally hoop-shaped tube with attachment ends engageable with the extension fasteners.

3 Claims, 4 Drawing Sheets

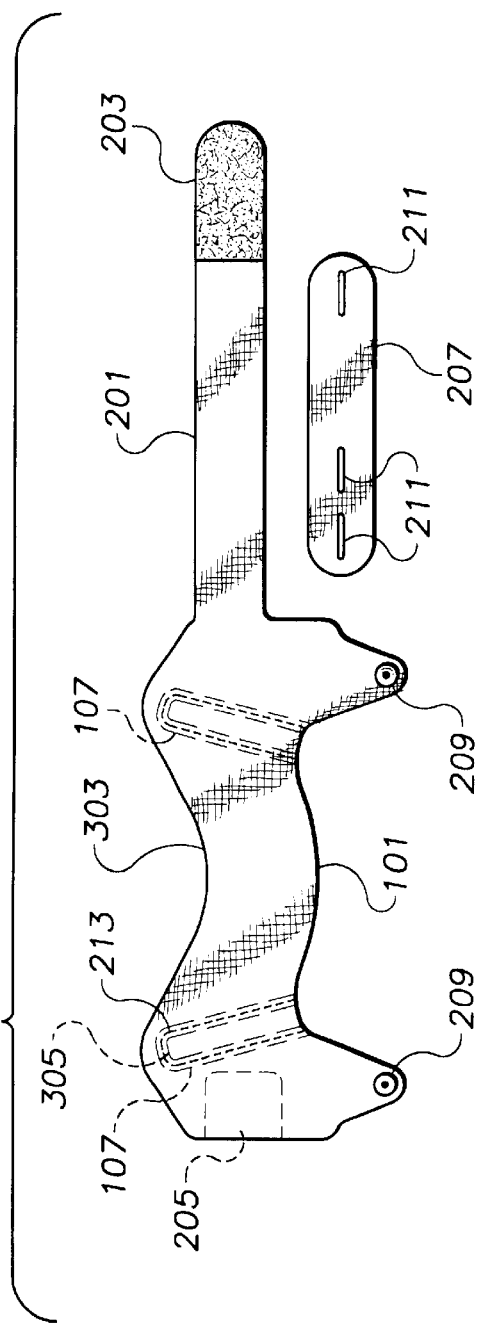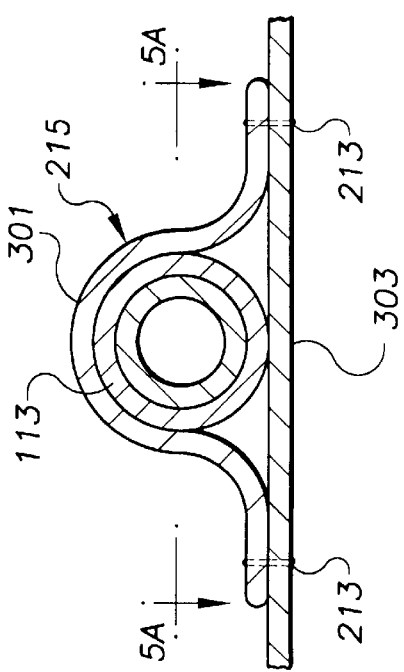

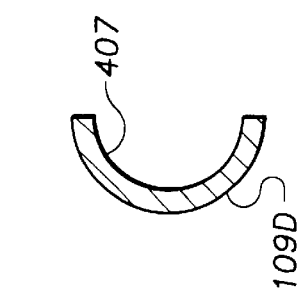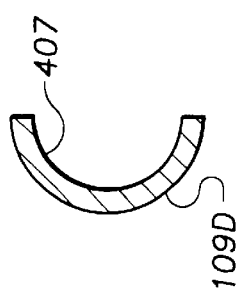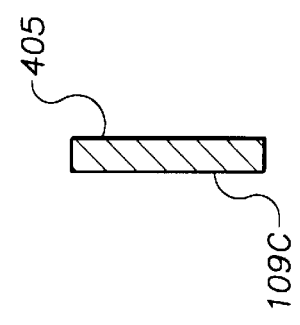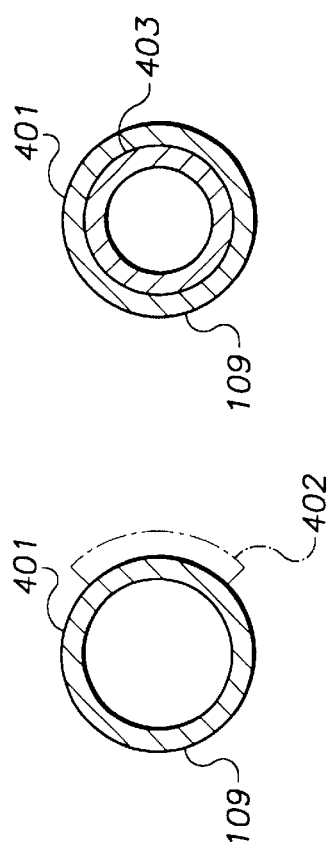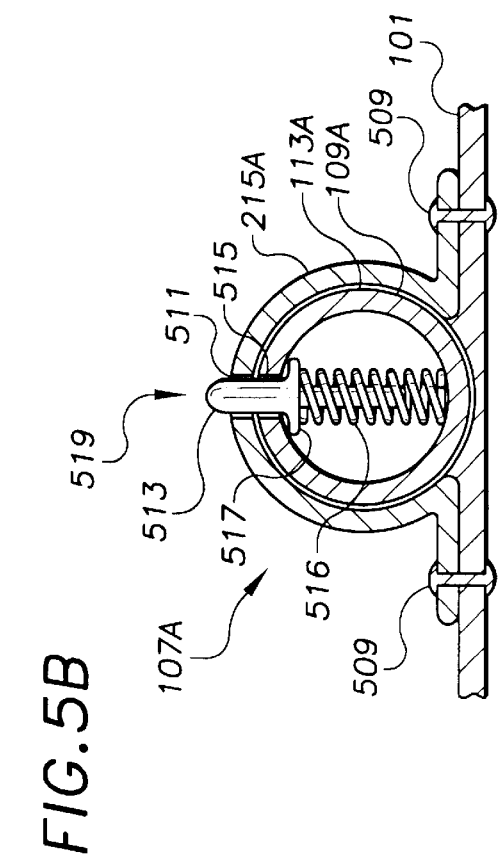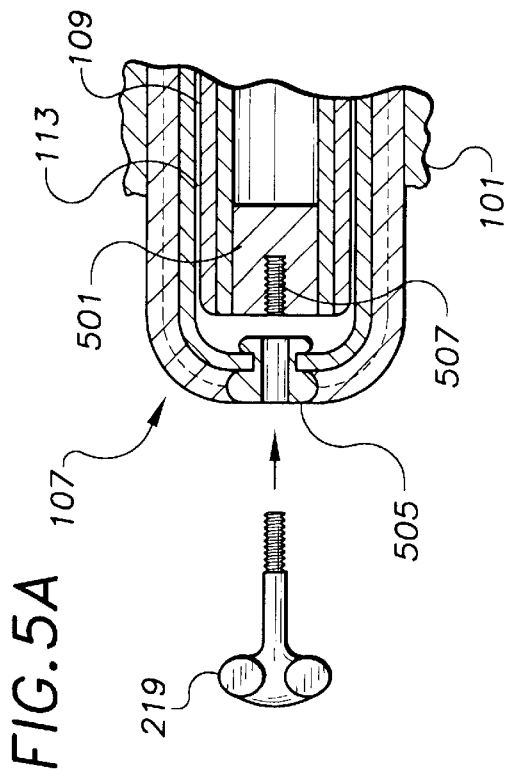

BLIND ANIMAL SAFETY HARNESS

BACKGROUND OF THE INVENTION

The present invention relates to apparatus used to protect visually impaired animals and, more particularly, to protect blind pets from collision with objects and obstructions in and around the home.

Care of blind or visually impaired animals such as household pets constitutes a significant problem to pet owners. The visually impaired animal may suffer injury upon collision with objects or obstructions inside or outside the home, especially if the object or obstruction is sharp or hot. Even if no injury results, constant direct collision with objects or obstructions may cause distress and anxiety for the pet and the pet owner. The owner's distress or anxiety often results from the inability to maintain or improve the quality of life of the pet.

Few options exist for a pet owner to reduce the effects of visual impairment. Medical or surgical treatments to improve the condition may be too expensive, impossible or ineffective. Constant attention may be impractical for the owner. Caging or chaining causes distress to the animal and may be dangerous if the animal becomes entangled or threatened by excessive heat or predatory animals.

A need exists for a simple, low-cost apparatus, which will protect a visually impaired animal from collision with surrounding objects and obstructions.

OBJECTS AND SUMMARY OF THE INVENTION

Therefore, an object of the present invention is to provide an apparatus which protects a visually impaired animal from direct contact with objects and obstructions in and around the home and other areas where the animal may frequent.

Another object of the present invention is to provide neuromuscular feedback to the animal to "learn" locations of objects and obstructions without physical injury to the animal.

Another object of the present invention is to provide an apparatus providing the owner with a method of improving the quality of life of the pet.

Yet another object of the present invention is to provide an apparatus for visually impaired animals which is simple and low in cost.

Still another object of the present invention is to provide an apparatus for visually impaired animals which protects furniture and delicate items from damage resulting from collision with the apparatus.

The apparatus of the present invention comprises a harness and an elongated harness extension. A fastener such as a hook and loop fastener attaches the harness to the front trunk portion of the visually impaired animal. One or more extension fasteners attaches the elongated harness extension and supports it to extend forward of the animal's head in a generally horizontal direction. The forward extension of the harness extension beyond the animal's head results in contact with an obstruction in front of the animal before the animal's head could contact the obstruction.

The device transmits contact forces of the harness extension to the trunk portion of the animal's body. Transmission of the contact forces to the truck of the body reduces stress and possible injury to the animal, while it provides neuromuscular feedback, creating a "leaning" tool for the animal. The device also precludes contact with sharp or hot objects and reduces possible serious injury to the animal.

In the preferred embodiments, the harness extension comprises a tube bent to form a semicircular or hoop-shaped portion and two parallel attachment portions. The attachment portions form the two ends of the tube. Extension fasteners on either side of the harness receive and secure the attachment portions of the harness extension to the harness. The hoop portion of the harness extension extends forward of, and lateral to, the head of the animal. The forward and lateral extension provides protection from direct contact, yet allows the animal's head complete freedom of movement without contacting the harness extension.

In the preferred embodiments, the harness is made of fabric such as canvas or denim. The harness extension is made of a resilient outer tube with a light rigid inner tube of aluminum in the attachment portion. In other embodiments, the entire harness extension is made of semi-rigid plastic tubing.

Still other embodiments employ various harness extension shapes to provide forward and forward/lateral extension from the animal's head. Quick-release lock fasteners such as pin-aperture fasteners allow quick and easy removal or the harness for washing. Hook and loop harness fasteners adjust to fit various sized animals.

BRIEF DESCRIPTION OF THE DRAWINGS

These and other features, aspects and advantages of the present invention will become better understood with regard to the following description, appended claims and accompanying drawings, where:

FIG. 3 is a plan view of the inside surface of the harness and chest strap of FIG. 1 showing hook and loop harness fasteners and button chest strap fasteners;

FIG. 3A is a cross section drawing of an extension fastener taken along lines 3A—3A of FIG. 2;

FIG. 4A is a cross section of the harness extension taken along lines 4A—4A of FIG. 2, another embodiment having a resilient pad shown in broken lines;

FIG. 4B is a cross section of the harness extension taken along lines 4B—4B of FIG. 2;

FIG. 4C is a cross section of another embodiment of the harness extension having a rectangular cross section;

FIG. 4D is a cross section of another embodiment of the harness extension having a semicircular cross section;

FIG. 5A is a cross section of the extension fastener taken along lines 5A—5A of FIG. 3A showing an embodiment of a releasable lock for the extension fastener utilizing a lock screw engageable with a threaded plug in the harness extension;

FIG. 5B is a cross section of another embodiment of a quick-release lock for an extension fastener utilizing a spring-biased lock pin, which engages with apertures in the extension fastener;

DESCRIPTION OF THE PREFERRED EMBODIMENTS

The following is a description of the blind animal safety harness providing protection for the animal from potentially dangerous objects in and around the home.

Figure 1:
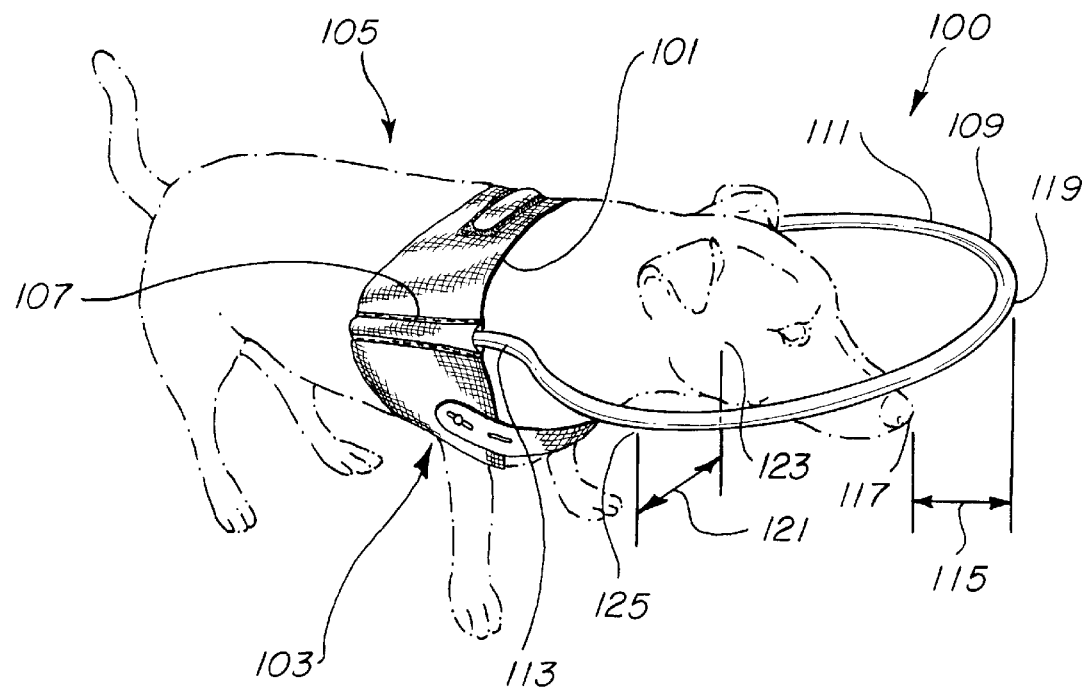
FIG. 1 is a perspective drawing of an embodiment of the present invention comprising a harness secured to the forward trunk portion of a visually impaired animal's body, shown in phantom lines, a hoop-shaped harness extension and one of a pair of extension fasteners supporting the harness extension in a generally horizontal configuration, the shape of the harness extension providing forward and lateral clearance from the head of the animal.

FIG. 1 is a perspective drawing of the blind animal safety harness embodiment 100, comprising a harness portion 101 attachable to the forward trunk portion 103 of a blind animal 105. An extension fastener 107 fastens an elongated harness extension 109 to harness portion 101.

In a preferred embodiment, elongated, hoop-shaped harness extension 109 comprises a hoop portion 111 and two longitudinally extending attachment portions 113 attachable to extension fasteners 107. Only one attachment portion and extension fastener is shown in this figure. The opposite side in the preferred embodiments is similar.

Harness extension 109 provides both collision injury protection and object avoidance feedback for the blind animal by providing both forward and lateral clearance between the harness extension and the animal's head and neck area when the harness is fixed to the forward trunk portion of the animal. Forward clearance 115 between the forwardmost part 117 of the animal's head and the forward portion 119 of harness extension 109 protects the animal from objects and obstructions directly in front of the animal. Lateral clearance 121 between a side 123 of the animal's head and a side portion 125 of harness extension 109 protects the animal from objects or obstruction to the side of the animal's head.

Figure 2:
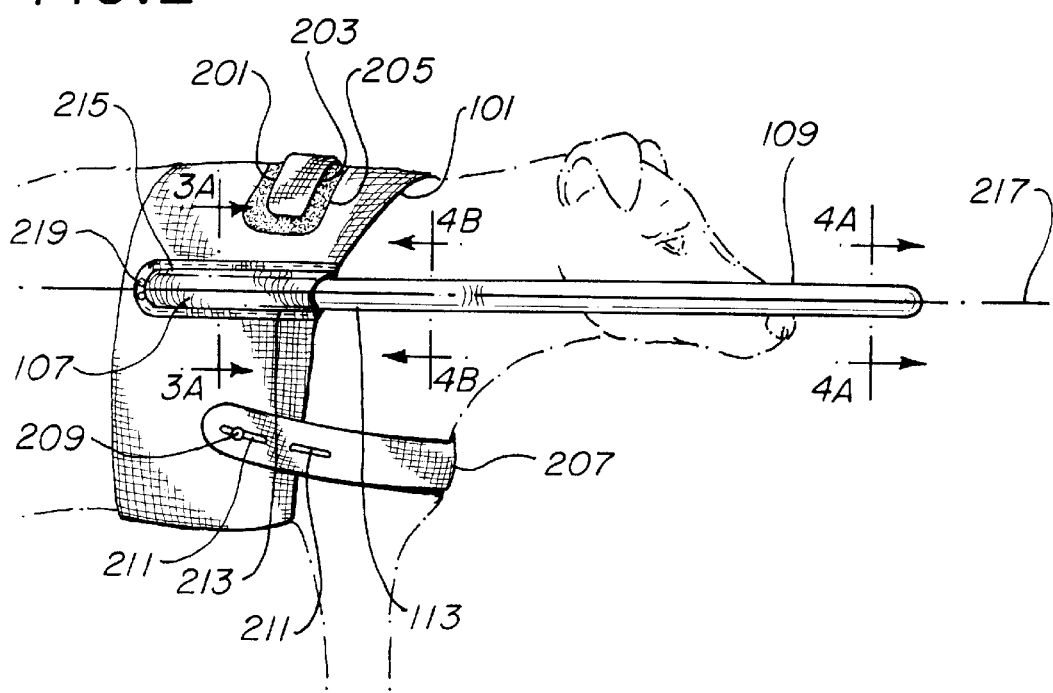
FIG. 2 is a side elevation drawing of the embodiment of FIG. 1 showing harness and harness extension fasteners.

FIG. 2 is a side elevation drawing of the blind animal safety harness 100 of FIG. 1 showing harness portion 101 secured to the forward trunk portion of the animal by a fastener such as strap 201. In the preferred embodiments fastener 201 comprises a hook and loop fastener component 203 on the inside surface of the strap. A complementary hook and loop fastener component 205, attached to an outside surface of harness portion 101 engages hoop and loop fastener component 203 of strap 201. Strap 201 provides a quick method of fastening harness portion 101 to the animal and allows fitting to different sized animals. In other embodiments, button, snap or buckle fasteners provide an adjustable fastening means for strap 201.

Chest strap 207 provides additional stability to harness portion 101 and prevents rotation or axial movement of harness portion 101 when secured. A fastener component such as button 209 of harness portion 101 attaches to a complementary fastener component such as button holes 211 of chest strap 207. Multiple button holes provide a means to fit chest strap 207 to different-sized animals. A similar fastener attaches chest strap 207 to the opposite side of the harness in the preferred embodiment. In other embodiments, the opposite end of chest strap 207 is fixed by sewing, bonding or other mechanical fasteners. Hook and loop fasteners, snap or buckle fasteners, substituted for button fasteners, provide other methods of convenient and adjustable fastening of strap 207.

Extension fastener 107, fixed to harness portion 101 by stitches 213, provides an attachment means and support for harness extension 109. In the preferred embodiments, extension fastener 107 comprises a sleeve 215. Sleeve 215 receives attachment portion 113 of harness extension 109 to align and support the longitudinal axis 217 of harness extension 109 in a generally horizontal alignment when harness 101 is fitted to the animal as shown. Lock screw 219 fixes attachment portion 113 of harness extension 109 into sleeve 215 of extension fastener 107. In the preferred embodiments, at least a portion of harness extension 109 is at approximate eye or nose level of the head of the animal in a normal standing position.

FIG. 3 is a plan view of the inside surface of harness portion 101 and chest strap 207. In the preferred embodiments, harness portion 101 and chest strap 207 are made of fabric. In other embodiments, they are made of leather, plastic or other polymeric materials. In the preferred embodiments, harness portion 101 is made of canvas or denim.

In the preferred embodiments, extension fasteners 107, shown in cross section in FIG. 3A are made of fabric portions (301 of FIG. 3A) sewn to the outside of body 303 of harness portion 101 and secured by stitches 213. Fabric portions 301 form sleeves 215 for receiving attachment portions 113 of harness extension 109. End portions 305 of sleeves 215 provide end closure and lock attachment means for fastener 107.

In the preferred embodiments, chest strap 207 is made of the same material as harness portion 101. Button holes 211 engage buttons 209 of harness portion 101.

FIG. 4A is a cross section of harness extension 109 taken at 4A—4A of FIG. 2. Outer tube 401 forms the hoop portion 111 of the harness extension and in the preferred embodiments is made of a plastic material such as polyethylene (PE), polypropylene (PP), acrylonitrile butadiene styrene (ABS), polyvinyl chloride (PVC) or polyamide (PA). In other embodiments, outer tube 401 is made of metal or composites. In the preferred embodiments, outer tube 401 is made of a material with sufficient softness or resiliency to prevent scratching or damage to furniture or other objects contacted by harness extension 109. In another preferred embodiment (shown in broken lines), a resilient pad 402, bonded to outer tube 401 provides additional protection for furniture and reduces jarring to the animal when contacting an object. In still other embodiments, resilient pad 402 is a resilient protective tube stretched over outer tube 401.

FIG. 4B is a cross section of the attachment portion 113 of harness extension 109 taken at 4B—4B of FIG. 2. Inner tube 403 forms an interference or shrink fit with outer tube 401 and adds stiffness and strength to harness extension 109. Since inner tube 403 does not contact furniture or other household objects, the material may be chosen for rigidity, strength and shape-holding qualities. In the preferred embodiments, inner tube 403 is made of aluminum. In other embodiments, inner tube 403 is made of plastic or composites. Additional stiffness reduces bending in the attachment portion 113 of harness extension resulting from higher bending loads as compared to the outer portions of the extension.

In other embodiments, the entire harness extension comprises only an outer tube 401, or the entire harness extension may comprise both inner tube 403 and outer tube 401.

Tubular cross sections such as 4A and 4B provide a light structure with adequate stiffness, an important feature because the animal must support the weight of the extension.

FIG. 4C is a rectangular cross section of harness extension 109C. Rectangular cross section 405 provides good rigidity in the vertical direction to prevent drooping of the harness extension and provides more flexibility in the lateral and frontal directions. Such flexibility would be useful for smaller animals. FIG. 4D is a C-shaped cross section 407 of another embodiment 109D of the harness extension. Still other harness extension cross sections are possible within the scope of this invention including I-sections, channel sections, angle sections, J-sections, X-sections and other tubular and solid shapes.

FIG. 5A is a cross section of fastener 107 taken along lines 5A—5A of FIG. 3A comprising threaded plug 501 fixed in the end of attachment portion 113 of harness extension 109. A threaded fastener such as a wing lock screw 219 clamps fastener 107 end bushing 505 to end plug 501 when engaged with threads 507 of end plug 501. Lock screw 219, end bushing 505 and end plug 501 form a releasable lock assembly allowing removal of harness extension 109 from harness portion 101 for washing or apparatus maintenance.

FIG. 5B is a detail end cross section of an alternative embodiment 107A of an extension fastener. Fastener 107A comprises a rigid or semi-rigid tubular structure such as flanged sleeve 215A fixed to harness portion 101 by fasteners 509. One or more apertures 511 of sleeve 215A engage spring-biased pin 513 of harness extension 109A. Aperture 515 in attachment portion 113A of harness extension 109A retains pin 513 in attachment portion 113A. Helical spring 516 biases pin 513 in the extended or engaged position shown in the figure. Pin flange 517 provides a stop for pin 513. Insertion of pin 513 in direction 519 allows easy and quick removal of harness extension 109A from fastener 107A.

Reattachment of the harness extension is accomplished by depressing pin 519 and inserting attachment portion 113A of harness extension 109A into sleeve 215A until pin 513 extends and engages aperture 511 of fastener 107A. Engaging pin 513 in aperture 511 also prevents twisting of attachment portion 113A relative to fastener 107A, which is useful in single-element harness extensions such as that shown in FIG. 6D.

Other quick-release fasteners known in the art may be used as secure/release components of harness extension 109 to fastener 107 of FIG. 1 such as plug-receptacle fasteners, lever fasteners, bayonet fasteners, twist fasteners and magnetic fasteners. Thus, extension fastener 107 provides a means of securing the harness extension to the harness so that the harness extension will not separate during activity, yet can be removed from the harness without tools. In less preferred embodiments, fastener 107 is a fixed fastener such as rivets or adhesive bonding agents.

Figure 6A:
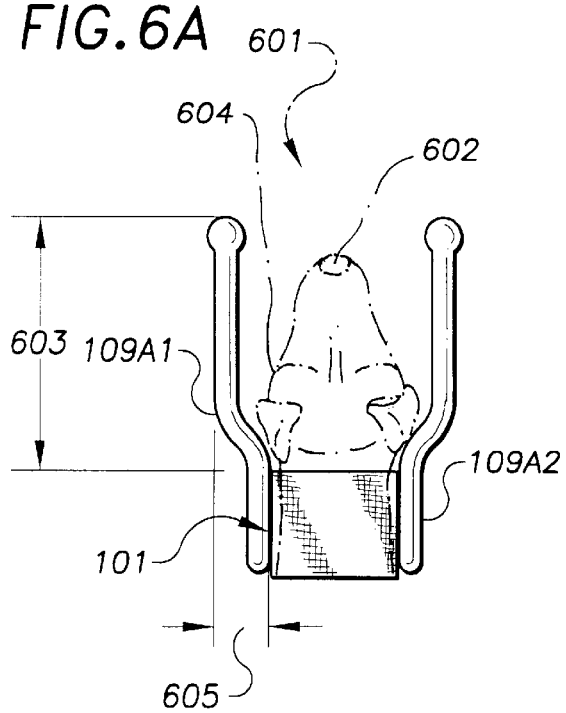
FIG. 6A is a plan view of another embodiment of the present invention showing a pair of elongated harness extensions supported on either side of the harness, each harness extension having a lateral offset to provide lateral as well as forward extension beyond the animal's head.

FIGS. 6A—6D show alternative embodiments of harness extension 109 of FIG. 1. FIG. 6A is a plan view of a two-piece harness extension 109A1 and 109A2. The apparatus provides forward extension 603 longitudinally forward of harness 101 beyond the front part 602 of the head of animal 601 when the harness is fitted to the animal. The apparatus also provides lateral extension 605 laterally from harness 101 beyond the side 604 of the head of animal 601.

Figure 6B:
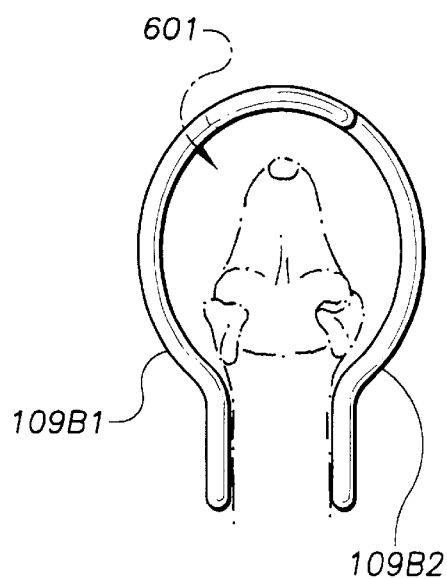
FIG. 6B is a plan view of another embodiment of the present invention showing a pair of elongated harness extensions supported on either side of the harness, the harness extensions having lateral and vertical offset portions and a generally semicircular shape to provide forward and lateral clearance.
Figure 6C:
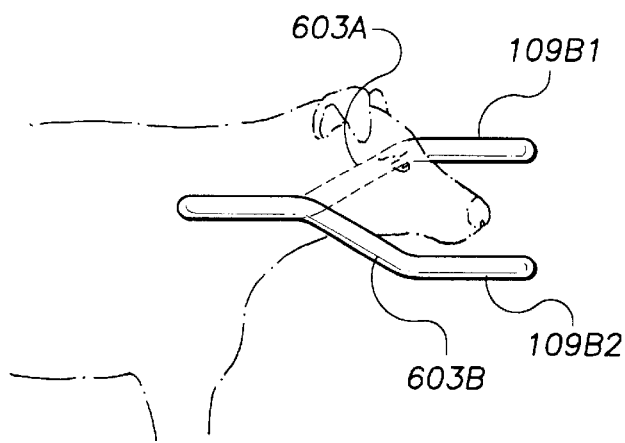
FIG. 6C is a side elevation drawing of the pair of elongated harness extensions of FIG. 6B showing the vertical spacing of the harness extensions provided by the vertical offsets of the harness extensions.

FIG. 6B is a plan view of another embodiment of two-piece harness extensions 109B1 and 109B2. FIG. 6C is a side view of harness extensions 109B1 and 109B2 of FIG. 6B showing elevation-adjustment portions 603A and 603B, which provide an elevation difference between harness extensions 109B1 and 109B2. Elevation portions 603A and 603B provide improved access to the mouth area of the animal for feeding, etc. Another embodiment of the invention provides two or more hoop extensions of FIG. 1 fixed at different elevations on harness portion 101 by multiple extension fasteners (not shown).

Figure 6D:
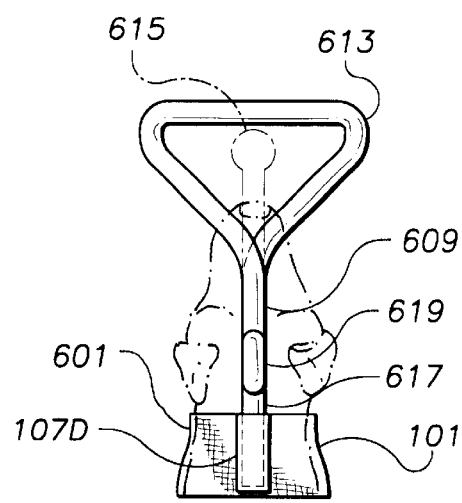
FIG. 6D is a plan view of another embodiment of the present invention incorporating a single elongated harness extension supported by a extension fastener on the top of the harness, the harness extension having a hoop-shaped portion for forward and lateral extension and a bumper for forward extension only.

FIG. 6D is a plan view of yet another embodiment of the present invention showing a single-fastener harness extension 609 attached to fastener 107D of harness 601. Hoop-shape or other laterally extending end portion 613 of harness extension 609 provides the forward and lateral extension described in earlier embodiments when engaged to fastener 107D. Yet another embodiment having a small bumper portion 615 (shown in phantom lines) provides forward extension as described earlier. Attachment portion 617 of harness extension 609 attaches to fastener 107D and may comprise an elevation adjustment portion 619 as described previously to allow necessary head clearance for animal 601.

A great variety of harness design variations are possible within the scope of the present invention including use of different harness materials, shapes, colors and configurations. Or, harness portion 101 may be replaced by an elastic hoop of stretchable material to secure the harness. Decals, emblems, pins, paints or sewn designs provide possible decorations within the scope of the invention.

Accordingly, the reader will see that the BLIND ANIMAL SAFETY HARNESS disclosed and claimed provides an apparatus for protecting a blind or visually impaired animal from contact with objects and obstructions. The apparatus provides the following additional advantages:

The animal maintains freedom of movement for exercise and other normal activities;

Neuromuscular feedback provided by the apparatus trains the animal to avoid objects without hard collisions;

The apparatus is lightweight and prevents excessive stress on the animal;

Adjustable fasteners on the harness portion allow the apparatus to fit a wide variety of animals;

Resilient hoop materials protect furniture and other objects;

The apparatus is simple and low in cost.

Although the description above contains many specifications, these should not be construed as limiting the scope of the invention but merely providing illustrations of some of the presently preferred embodiments of this invention. Thus the scope of the invention should be determined by the appended claims and their legal equivalents, rather than by the examples given.

I claim:

1. An apparatus for protecting blind animals comprising:
   a harness portion attachable to a forward trunk portion of an animal, the harness portion comprising a chest strap and made of a flexible material and securable to the trunk portion in a predetermined position;
   an elongated harness extension comprising a hoop shaped portion and two longitudinally extending attachment portions, the extension comprising a longitudinal axis in an elongated direction, the harness extension attachable to the harness portion by an extension fastener; and a quick-release fastener element attached to said two longitudinally extending attachment portions for releasably locking said elongated harness extension to said extension fastener;

wherein the extension fastener supports the harness extension in a generally horizontal direction and the harness extension extends forward of, and lateral to, the head of the animal with the hoop portion disposed at an elevation between an eye level and a nose level when the animal is in a normal standing position.

2. The apparatus of claim 1 wherein said quick-release fastener element is a threaded end plug in each of said two longitudinally extending attachment portions.

3. The apparatus of claim 1 wherein said quick-release fastener element is a biased pin disposed in each of said two longitudinally extending attachment portions.

* * * * *